United States Patent [19]
Huang

[11] Patent Number: 5,820,140
[45] Date of Patent: Oct. 13, 1998

[54] STROLLER

[75] Inventor: Li-chu Chen Huang, Chiayi, Taiwan

[73] Assignee: Link Treasure Limited, Tortla, Virgin Islands (Br.)

[21] Appl. No.: 719,714

[22] Filed: Sep. 27, 1996

[51] Int. Cl.[6] ....................................................... B62B 1/02
[52] U.S. Cl. ......................... 280/30; 280/641; 280/645; 280/47.25
[58] Field of Search ................................ 280/30, 40, 639, 280/641, 651, 652, 645, 655, 655.1, 47.18, 47.24, 47.26, 47.25; 224/155, 153, 151, 158, 159, 160, 161

[56] References Cited

U.S. PATENT DOCUMENTS

| | | | |
|---|---|---|---|
| 3,144,014 | 8/1964 | Mantell, Jr. ................................ | 280/30 |
| 4,157,837 | 6/1979 | Kao ............................................ | 280/30 |
| 4,747,526 | 5/1988 | Launes ....................................... | 280/30 |
| 4,762,256 | 8/1988 | Whitaker .................................... | 280/30 |
| 5,662,339 | 9/1997 | Svendsen et al. .......................... | 280/30 |

*Primary Examiner*—Richard M. Camby
*Attorney, Agent, or Firm*—Kolisch Hartwell Dickinson McCormack & Heuser

[57] ABSTRACT

A stroller is provided to have a "U" shaped handle, a pair of supports pivotally connected with the handle through a joint having a plurality of spaces provided therein for receiving a switch provided on and pivotally connected with the joint and a pair of detachable wheel mechanism respectively and securely mounted on a distal end of each of the support. The stroller is then able to be folded and used as a back-pack to continue to carry a baby within the stroller while walking in the field or over any rough terrain.

4 Claims, 10 Drawing Sheets

STROLLER

FIELD OF THE INVENTION

The present invention generally relates to a stroller, and more particularly to a stroller which can be folded together and used as a back-pack.

BACKGROUND OF THE INVENTION

Strollers having a braking system for parking effectively, wheels for turning, and foldable means for storing the same have been widely used all over the world. By means of the above mentioned improved device, a user can provide a comfortable environment to a baby and convenience for herself/himself while walking outdoors.

Most of the devices are designed to provide a better environment for babies while walking outdoors, especially on paved roads. Yet, it is very difficult to push a stroller while walking on a rugged road, because a general stroller normally has four wheels.

Nowadays, recreation is emphasized for bringing families together, so, naturally, the number of outdoor activities will rise to meet the demand. Thus, if one of the families brings his/her child along to attend such an occasion, other family members will be busy pushing the stroller around in the wilderness. Even though they don't have to or can't push the stroller in some situations such as mountain climbing or crossing a river, they still have to carry the baby in their arms for a long time, which is very exhausting. Furthermore, when the baby is being carried over rough terrain to a smoother area, the stroller is left behind and so this result is clearly neither practical nor efficient.

From the previous description, it is noted that especially when taking a field trip with baby, a general stroller will no longer meet the requirement.

Thus, a stroller constructed in accordance with the present invention tends to mitigate and/or obviate the aforementioned problems.

SUMMARY OF THE INVENTION

The main objective of the invention is to provide a stroller which is able to be folded and used as a back pack to carry a baby therein. The stroller comprises only a pair of wheels and a plurality of foldable supports having a seat detachably attached to at least one of the supports.

Another objective of the invention is to provide a stroller having a pair of detachable wheels which can be easily and quickly removed without any effort.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
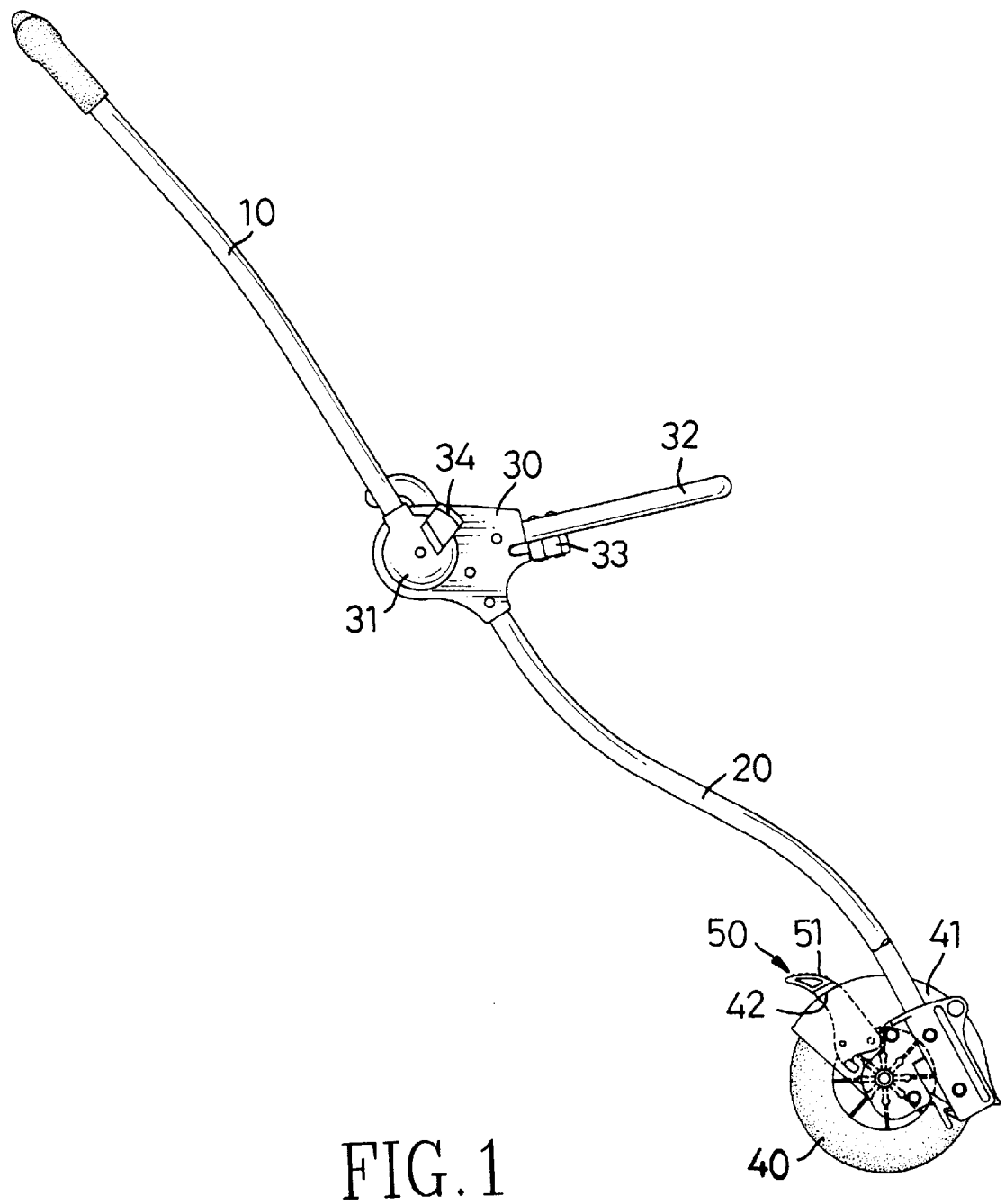
FIG. 1 is a side view of the invention.

Referring to FIG. 1, a stroller constructed in accordance with the present invention comprises a "U" shaped handle 10, a pair of supports 20, a pair of connectors 30 pivotally connected with the handle 10 and rigidly connected with the supports 20 and a pair of wheels 40 each having a braking system 50 mounted thereon and rotatably connected with the support 20. The handle 10 is pivotally connected with the connector 30 by means of a joint 31 provided on the connector 30, such that the stroller of the invention is foldable only if the joint 31 is in a proper position. A cross bar 32 is also pivotally connected with the connector 30 through a retainer 33. It is to be noted that the braking system 50 is also pivotally connected within a wheel cover 41 and a brake pedal 51 is inserted into an opening 42 of the cover 41 to engage with the wheel 40 to accomplish the purpose of braking.

Figure 2:
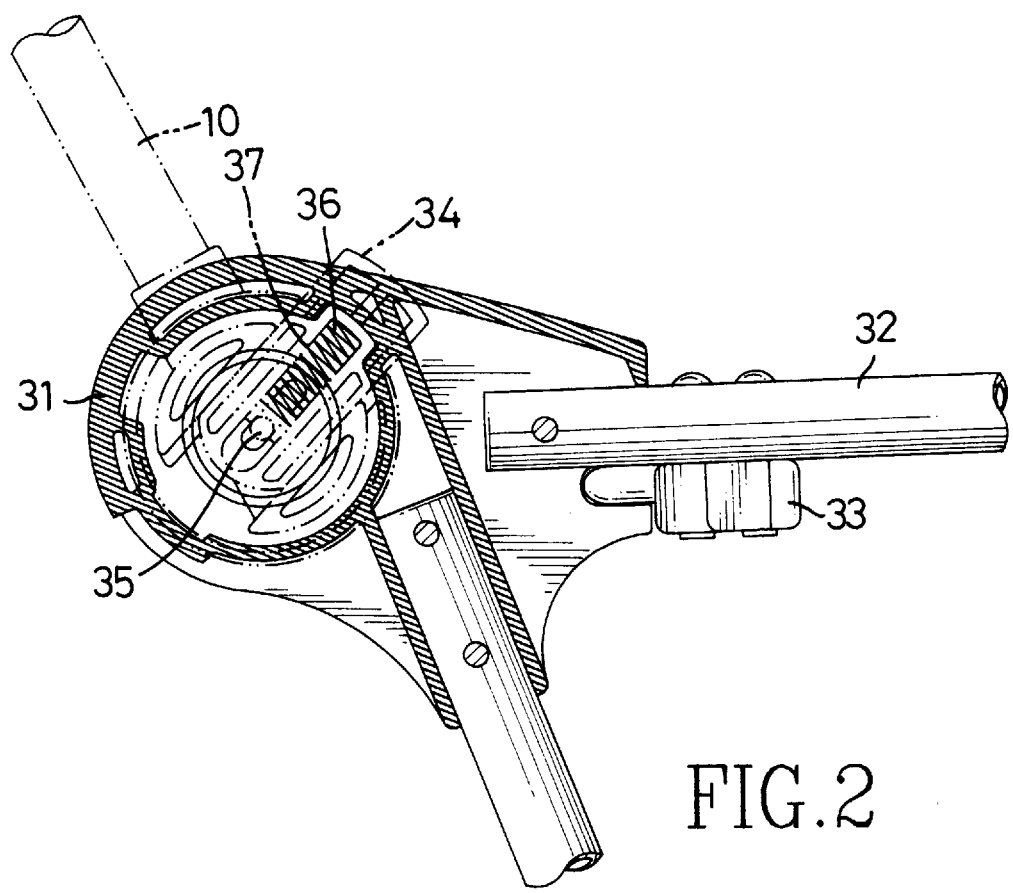
FIG. 2 a partial cross sectional view of a joint of the stroller.
Figure 3:
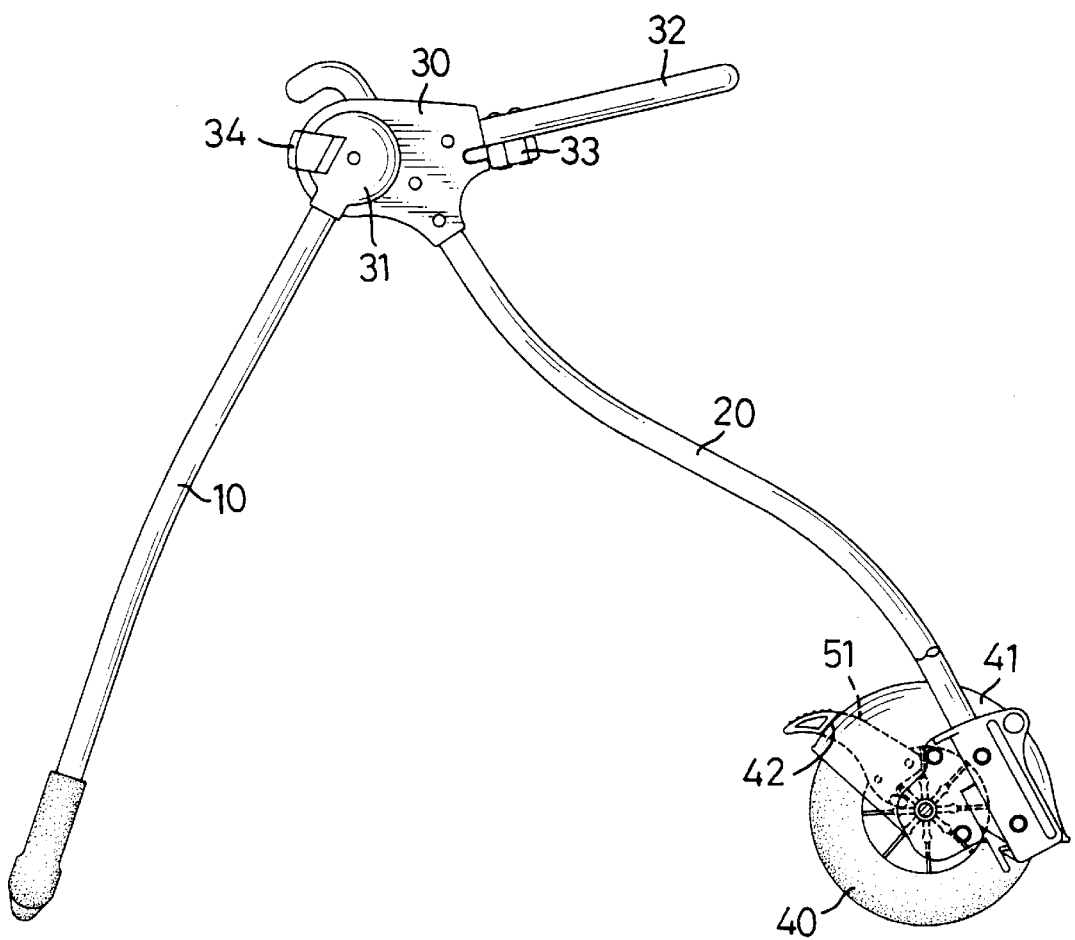
FIG. 3 is another plan view of the stroller showing the stroller is presenting a triangle after the joint has been switched to another position.
Figure 4:
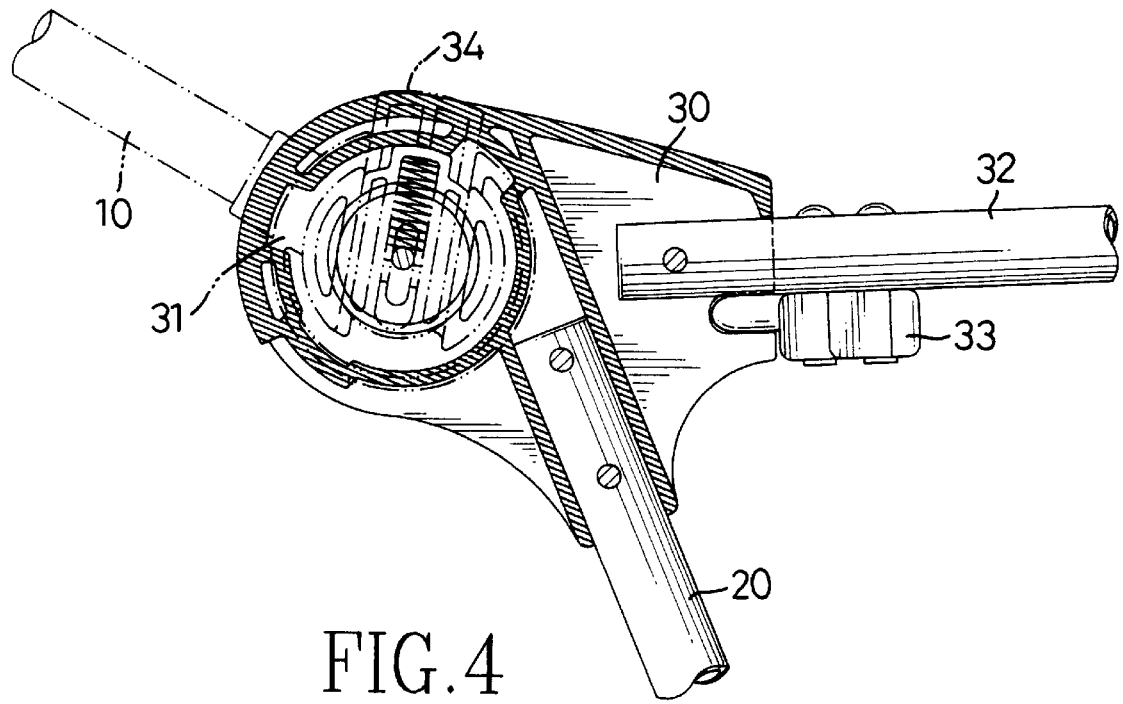
FIG. 4 is a partial cross sectional view showing a switch is pressed into the joint and the stroller undergoes a process of beig folded.
Figure 5:
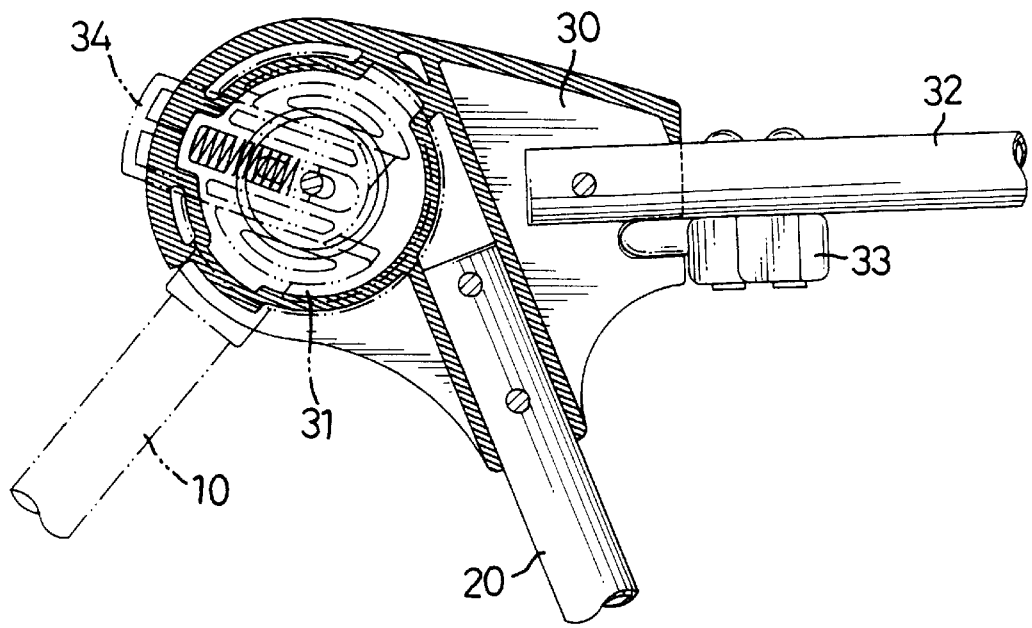
FIG. 5 is a partial cross sectional view showing the switch is retained within a notch provided in the joint.

Referring to FIGS. 2–5, it is to be noted especially from FIG. 2 that a part of the connector 30 incorporated with a substantially semi-circular hood (not numbered) form the joint 31. The joint 31 has a plurality of spaces (not labeled) provided therein and each space is configured to receive a switch 34 therein. The switch 34 is pivotally connected with the joint 31 by means of a pin 35 and a resilient member 36 is received within a slot 37 provided in the switch 34 and abutted by the pin 35. Thus, when the switch 34 is pressed downward into one space, the handle 10 is then released from the limitation of the joint 31 and is able to turn either clockwise or counterclockwise (in this case, the joint 31 is able to turn counterclockwise). It is better seen from FIG. 4 that the switch 34 is being pressed into the space and is rotated within the joint 31. The handle 10 will also be rotated when the switch 34 is rotated. Furthermore, the resilient member 36 within the slot 37 of the switch 34 will also be pressed due to the pin 35 when the switch 34 is being pressed downward. When the switch 34 reaches the next space, the switch 34 will eject out and again is limited by the joint 31 and the handle 10 is then rigidly positioned, as shown in FIG. 5. When the handle 10 is first positioned after the switch 34 is rotated and undergoes a distance, the status of the stroller is triangular as shown in FIG. 3.

Figure 6:
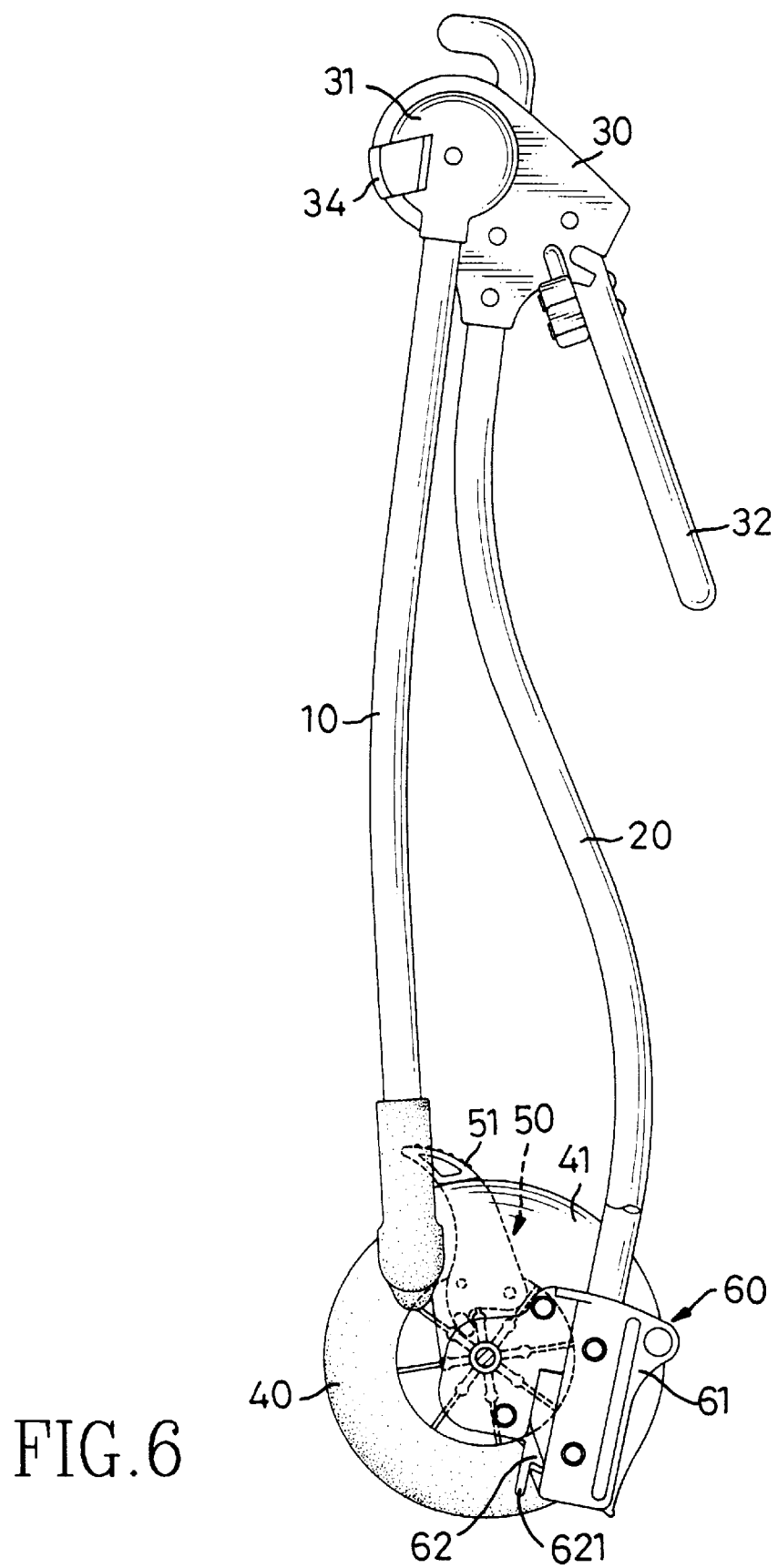
FIG. 6 is still another plan view of the stroller showing the completion of the folding of the stroller.

Referring to FIG. 6, if the switch 34 stops within the final space, the handle is then able to be pivoted with the support 20 thus folding the stroller for storage or use as a back pack.

Figure 7:
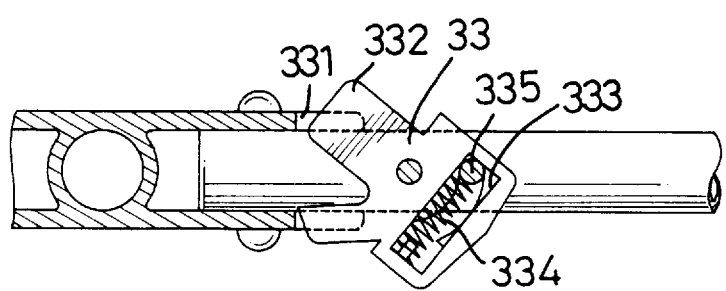
FIG. 7 is a top view of a retainer provided on a connector for controlling a cross bar.
Figure 8:
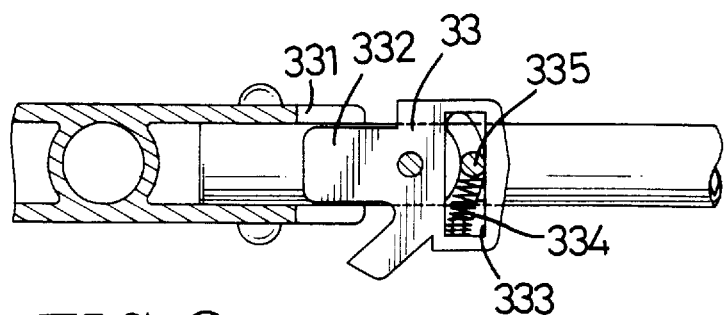
FIG. 8 is another top view of the retainer provided on the connector, showing the retainer is released from the engagement with the recesses.

Referring again to FIG. 2, FIG. 7 and FIG. 8, it is shown that the cross bar 32 is retained by the retainer 33, therefore, the cross bar 32 is able to be held in that position. Thus, it is noted that the connector 30 pivotally connected with the bar 32 is provided to have consecutive notches 331, and the retainer 33 is also configured to have a plurality of extensions 332 each received within a respective notch 331. An arcuate channel 333 having a spring 334 received therein is defined within the retainer 33. One end of the spring 334 urges against a second pin 335 provided on the cross bar 32, such that when the retainer 33 is rotated counterclockwise, the spring 334 is pressed, as shown in FIG. 8, and then when one extension 332 of the retainer 33 coincides with the cross bar 32, the cross bar 32 then leaves the limitation of the retainer 33 and is therefore foldable.

Figure 9:
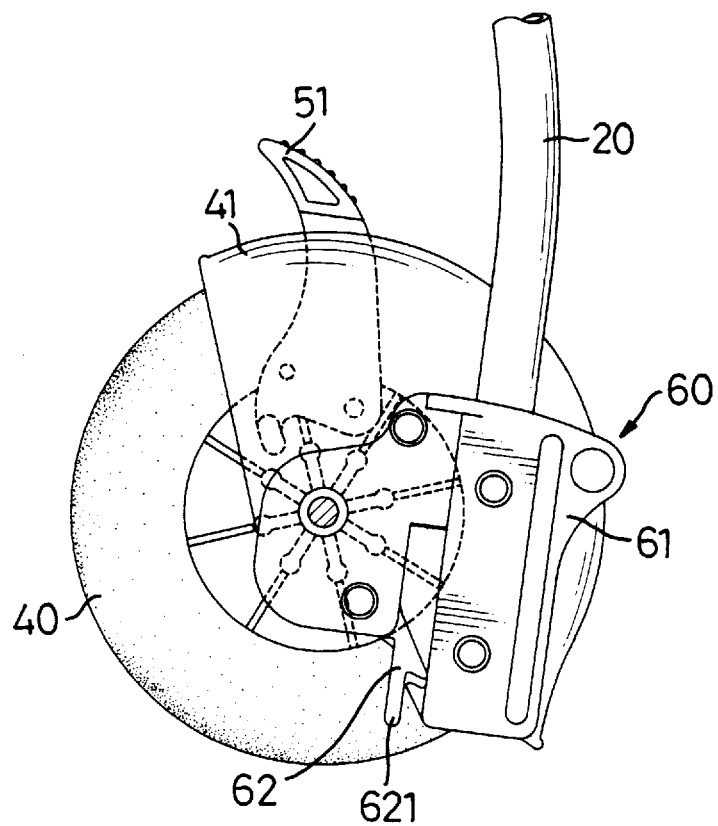
FIG. 9 is a plan view of a braking system of the stroller showing the braking system is released.
Figure 10:
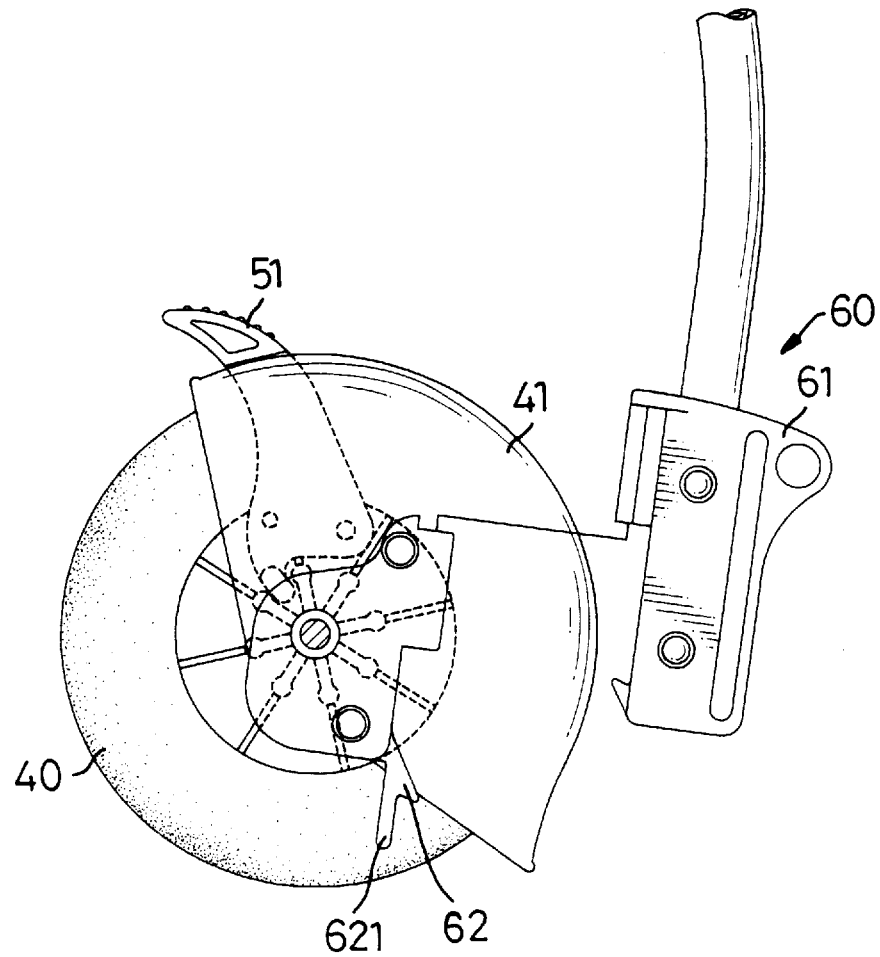
FIG. 10 another plan view of the braking system of the stroller showing a wheel with the braking system is separated from the body of the stroller.

Referring to FIG. 9, a detachable wheel mechanism and a braking system 50 are shown. The detachable wheel mechanism comprises a receiving member 61 securely provided on a distal end of the support 20 and a hooking member 62 securely provided on one side of the cover 41. When the stroller is in use, the hooking member 62 is securely abutted to the receiving member 61, and when the wheel 40 is no longer in need, a user will only have to pull back a finger 621 formed integrally with the hooking member 62, then the receiving member 61 will leave the limitation of the hooking member 62 and the wheel 40 together with the braking system 50 will eventually leave the support 20, as shown in FIG. 10.

Figure 11:
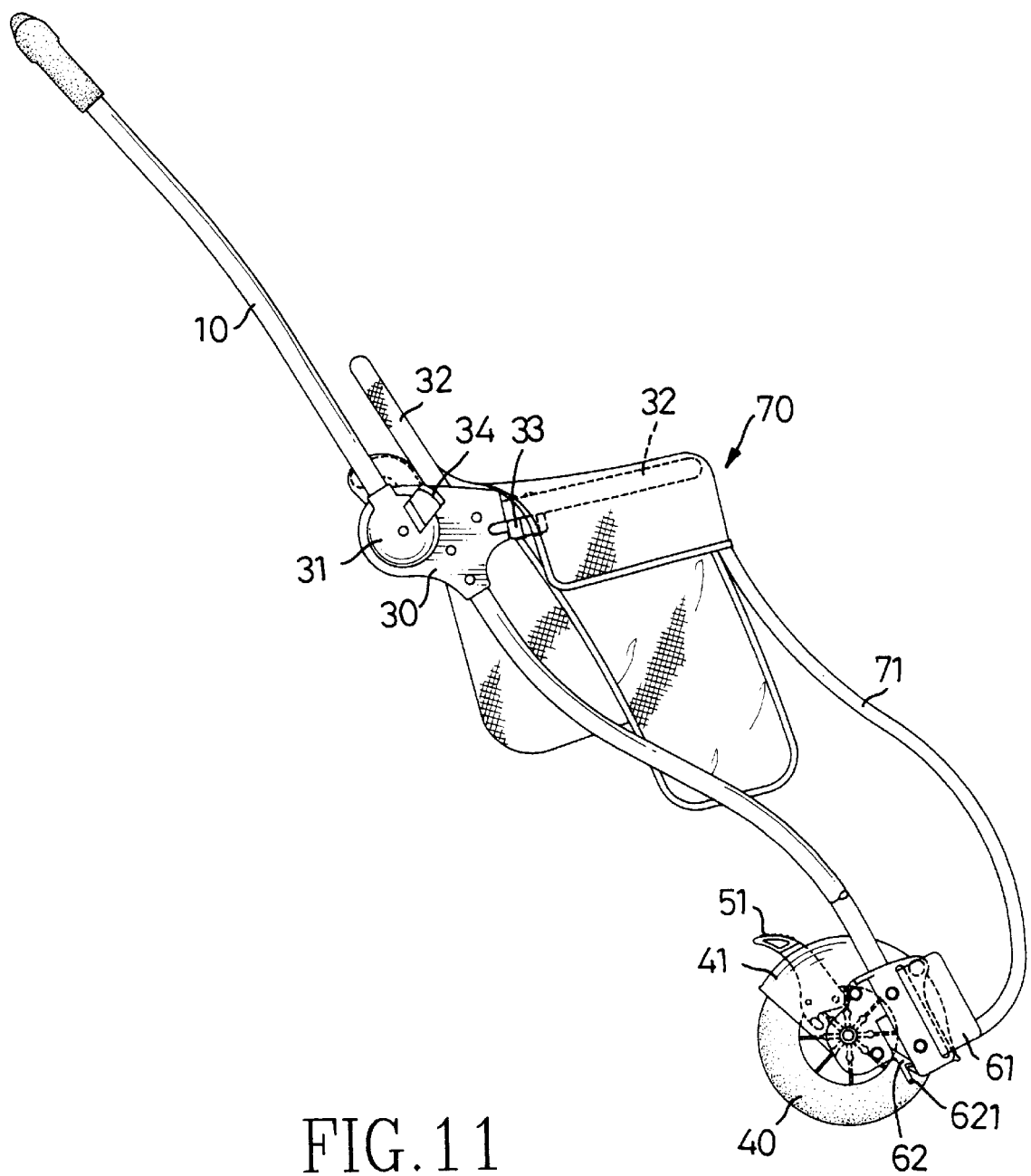
FIG. 11 is a schematic view of the stroller showing that the stroller is equipped with a seat and the braking system is retained in rigid position.
Figure 12:
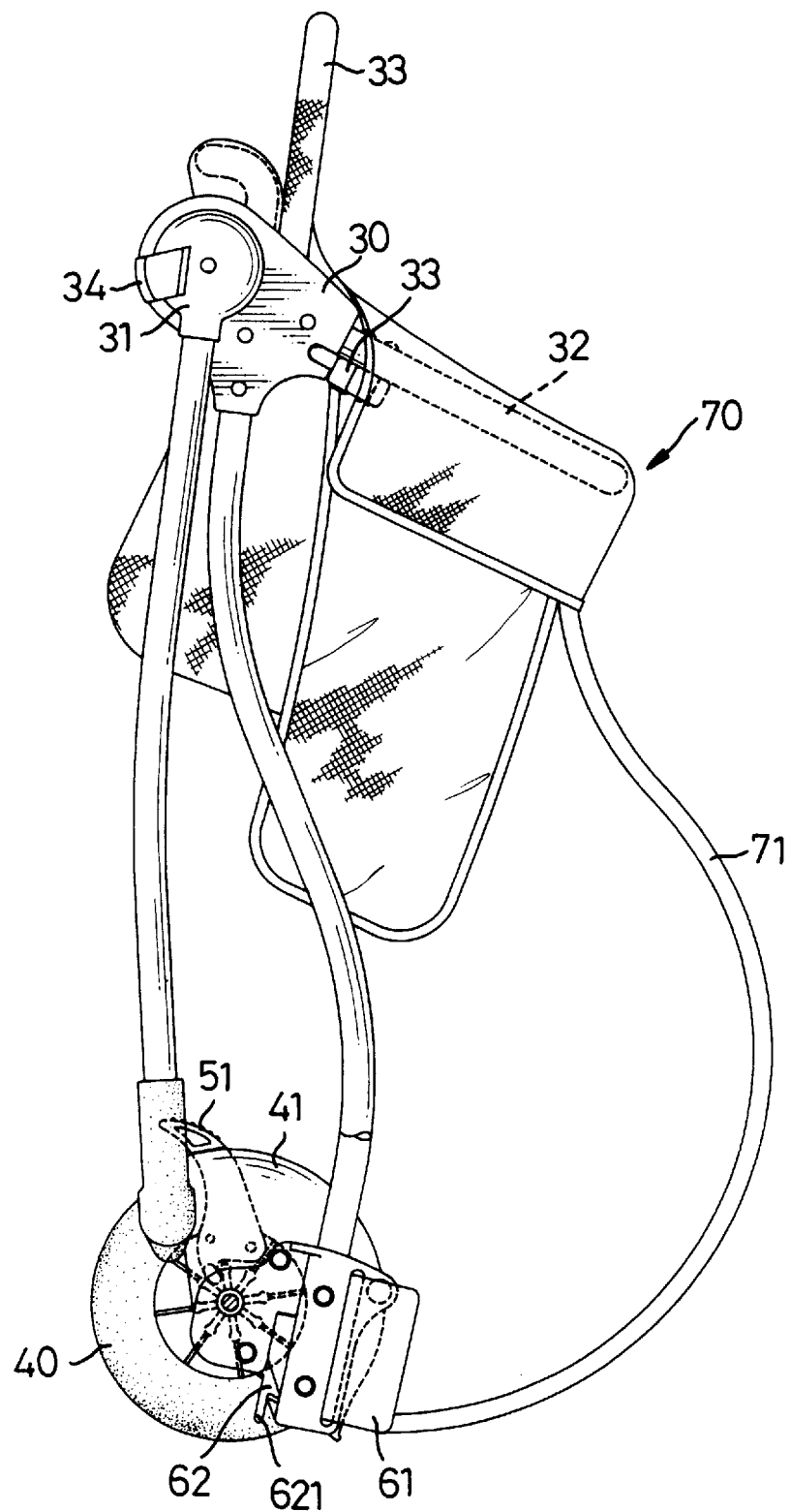
FIG. 12 is another schematic view of the stroller showing that the stroller is folded together and is ready to be used as a back pack.

Referring to FIG. 11 and FIG. 12, one embodiments of the stroller is shown. A pliable seat 70 with two belts 71 is put on the stroller for providing a seat for baby. A first end of each belt 71 is securely fixed with the seat 70, and a second end of each belt 71 is securely fixed with the receiving member 61, such that when the stroller is folded as the status as shown in FIG. 12, a user will easily carry the stroller of the invention on his/her back by means of the two belts 71.

Figure 13:
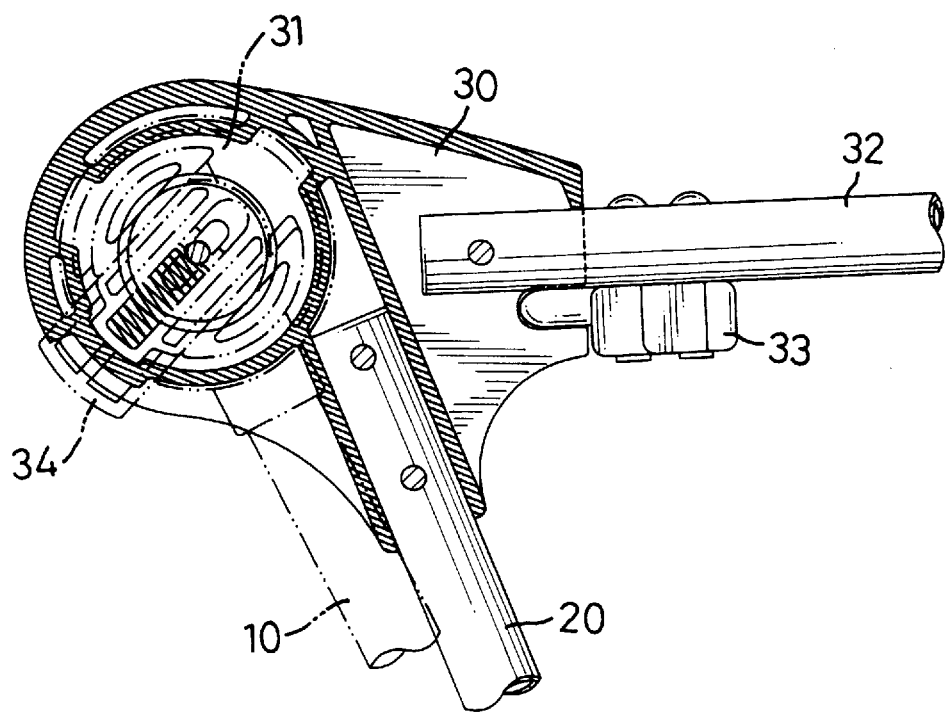
FIG. 13 is a partial cross sectional view showing the joint related to the position of the stroller as shown in FIG. 12.

FIG. 13 shows the related status of the joint 31. The switch 34 is positioned in the last space as previously described, yet, the cross bar is still limited by the retainer 33 and keeps in an upright position as shown in FIG. 11 and FIG. 12, such that a baby will still have a full support when the stroller is folded.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A stroller comprising:
   a connector having a joint pivotally connected therewith and provided with a plurality of spaces defined therein a switch pivotally connected within one of said spaces via a pin and a resilient member compressibly received within said switch and securely abutted by the pin and a retainer (both) pivotally connected therewith;
   a handle pivotally connected with said connector through said joint;
   a pair of supports rigidly connected with said connector;
   a cross bar pivotally connected with said connector and retained by said retainer;
   a pair of detachable wheel mechanism each having a braking system mounted thereon and pivotally connected on a distal end of one of said supports; and
   a resting member detachably mounted onto said supports.

2. A stroller comprising:
   a connector having a joint and a retainer pivotally connected therewith and having an arcuate channel provided therein, a spring compressibly received within said arcuate channel;
   a handle pivotably connected with said connector through said joint;
   a pair of supports rigidly connected with said connector;
   a cross bar pivotally connected with said connector and retained by said retainer;
   a pair of detachable wheel mechanisms each having a braking system mounted thereon and pivotally connected on a distal end of one of said supports; and
   a resting member detachably mounted onto said supports;
   a first end of said spring being securely abutted by a pin on said cross bar.

3. A stroller comprising:
   a connector having a joint and a retainer pivotally connected therewith;
   a handle pivotally connected with said connector through said joint;
   a pair of supports rigidly connected with said connector;
   a cross bar pivotally connected with said connector and retained by said retainer;
   a pair of detachable wheel mechanisms each having pivotally connected on a distal end of one of said supports and having a braking system mounted thereon, a cover pivotally connected thereon and having an opening defined therein, a wheel pivotally connected with said cover; a receiving member securely mounted on said distal end of one of said supports and a hooking member having a finger mounted thereon;
   said hooking member being detachably attached with said receiving member; and
   a resting member detachably mounted onto said supports.

4. A stroller comprising:
   a connector having a joint and a retainer pivotally connected therewith;
   a handle pivotally connected with said connector through said joint;
   a pair of supports rigidly connected with said connector;
   a cross bar pivotally connected with said connector and retained by said retainer;
   a pair of detachable wheel mechanisms each having pivotally connected on a distal end of one of said supports and having a braking system mounted thereon, a cover pivotally connected thereon and having an opening defined therein, a wheel pivotally connected with said cover; a receiving member securely mounted on said distal, end of one of said supports and a hooking member having a finger mounted thereon;
   said hooking member being detachably attached with said receiving member; and
   a resting member detachably mounted onto said supports;
   said braking system having a brake pedal inserted into said cover and pivotally connected with said mechanism and having a detachable engagement with said wheel.

* * * * *